(12) United States Patent
Kim

(10) Patent No.: US 8,185,164 B2
(45) Date of Patent: May 22, 2012

(54) MOBILE TERMINAL AND OPERATION CONTROL METHOD THEREOF

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 519 days.

(21) Appl. No.: 12/486,097

(22) Filed: Jun. 17, 2009

(65) Prior Publication Data
US 2010/0004031 A1 Jan. 7, 2010

(30) Foreign Application Priority Data

Jul. 7, 2008 (KR) .................. 10-2008-0065471

(51) Int. Cl.
*H04B 1/38* (2006.01)
(52) U.S. Cl. ............... 455/566; 455/414.1; 455/418; 455/419; 455/550.1; 345/156; 345/168; 345/169; 345/173; 715/702; 715/803; 715/810; 715/823; 715/825
(58) Field of Classification Search .... 455/414.1–414.4, 455/418, 419, 550.1, 566; 345/156, 168, 345/169, 173; 715/702, 803, 810, 825, 830
See application file for complete search history.

(56) References Cited

U.S. PATENT DOCUMENTS

| | | | |
|---|---|---|---|
| 7,587,683 B2* | 9/2009 | Ito et al. | 715/823 |
| 2004/0116167 A1* | 6/2004 | Okuzako et al. | 455/575.3 |
| 2006/0240875 A1* | 10/2006 | Miyazawa | 455/566 |
| 2006/0281449 A1 | 12/2006 | Kun et al. | |
| 2007/0103454 A1 | 5/2007 | Elias | |
| 2007/0176898 A1 | 8/2007 | Suh | |
| 2008/0182627 A1* | 7/2008 | Lincoln | 455/566 |
| 2008/0254837 A1* | 10/2008 | Klinghult et al. | 455/566 |

FOREIGN PATENT DOCUMENTS

| | | |
|---|---|---|
| CN | 1716974 | 1/2006 |
| WO | 9928813 | 6/1999 |

* cited by examiner

*Primary Examiner* — Olumide T Ajibade Akonai
(74) *Attorney, Agent, or Firm* — Lee, Hong, Degerman, Kang & Waimey

(57) ABSTRACT

A method of controlling a mobile terminal and includes displaying on a display of the mobile terminal a list having a plurality of items, identifying a selected item of the plurality items of the list, and detecting movement of the mobile terminal. The method further includes displaying on the display a menu having a plurality of items that are each associated with a function which can be performed based upon information associated with the selected item, wherein the displaying of the menu is in response to the detecting of the movement of the mobile terminal.

25 Claims, 17 Drawing Sheets

(a)

(b)

(a)  (b)

(a)  (b)

(a)  (b)

(a)  (b)

FIG. 12
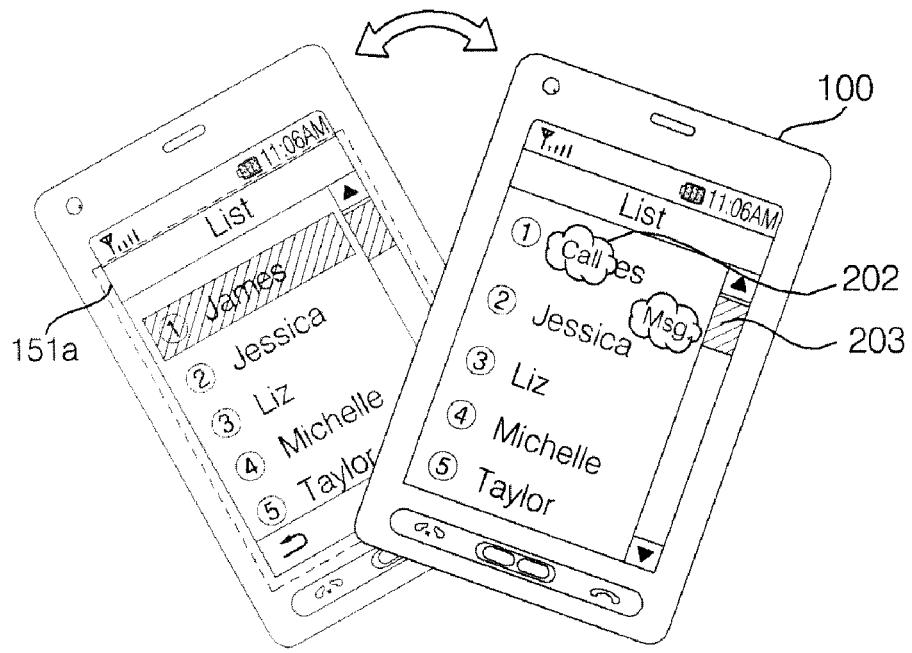
(a)
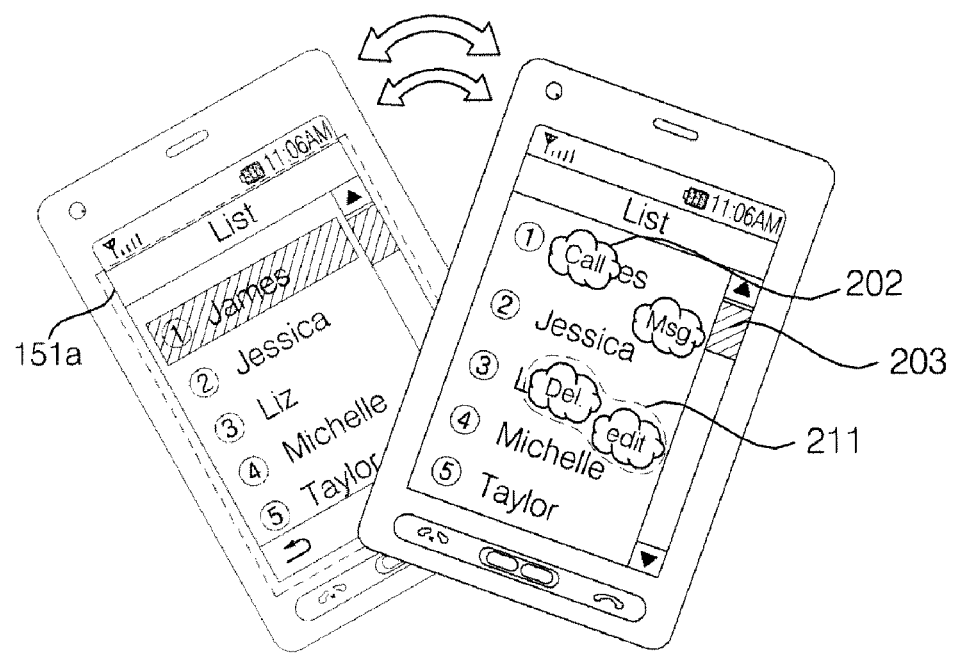
(b)

FIG. 13
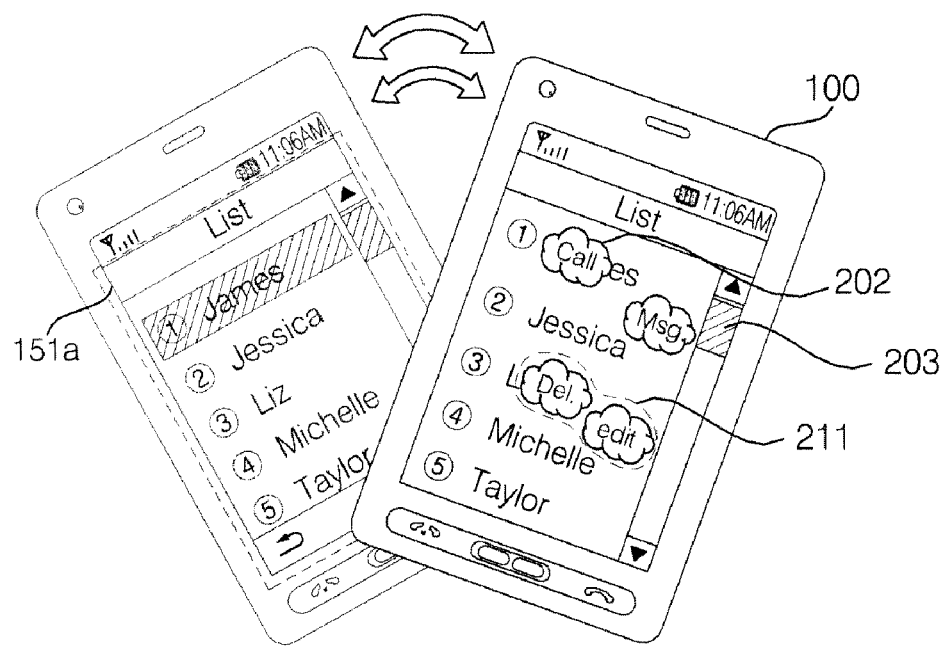
(a)
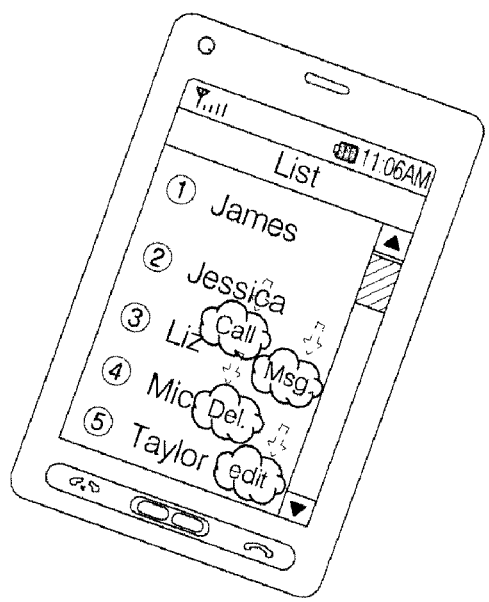
(b)

FIG. 15
(a) 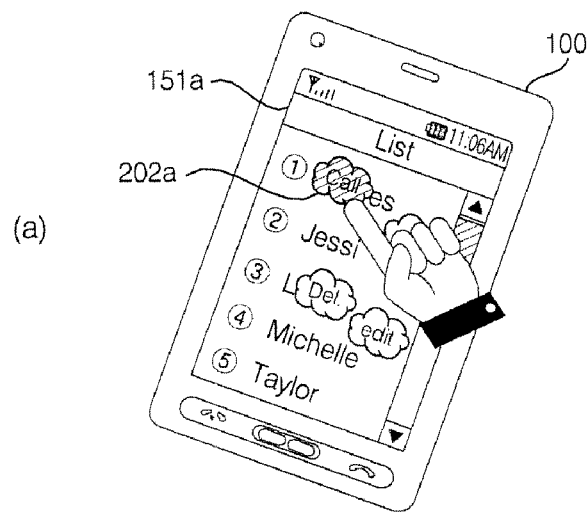
(b) 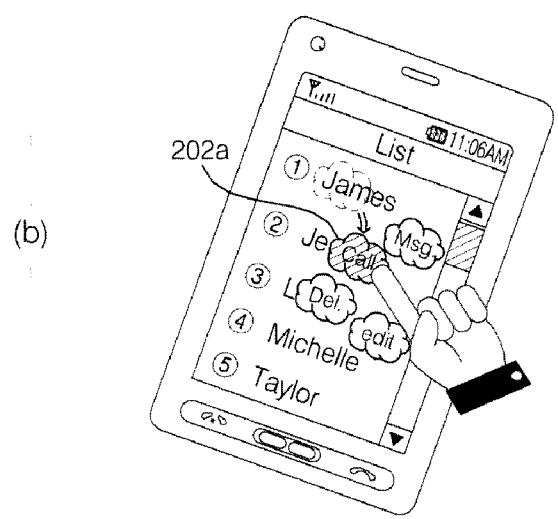
(c) 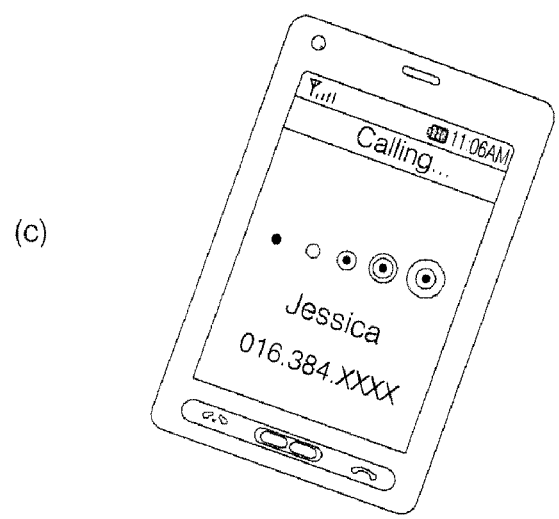

FIG. 17
(a) 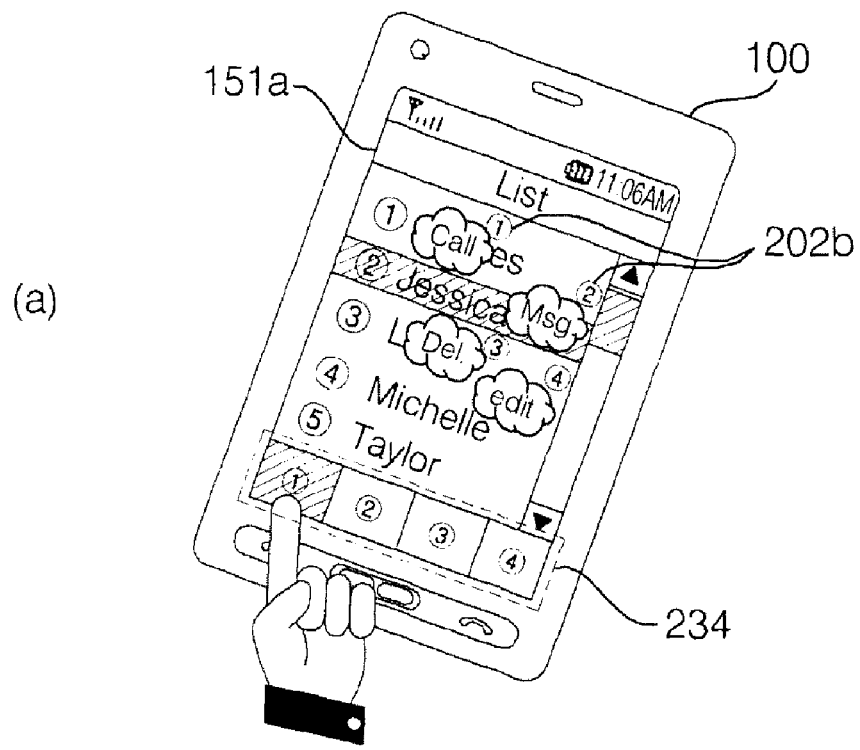
(b) 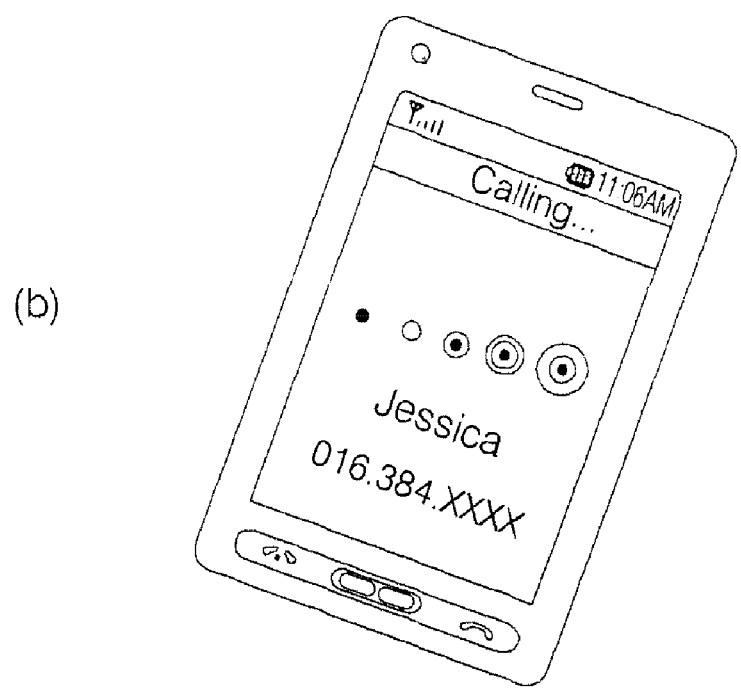

FIG. 18
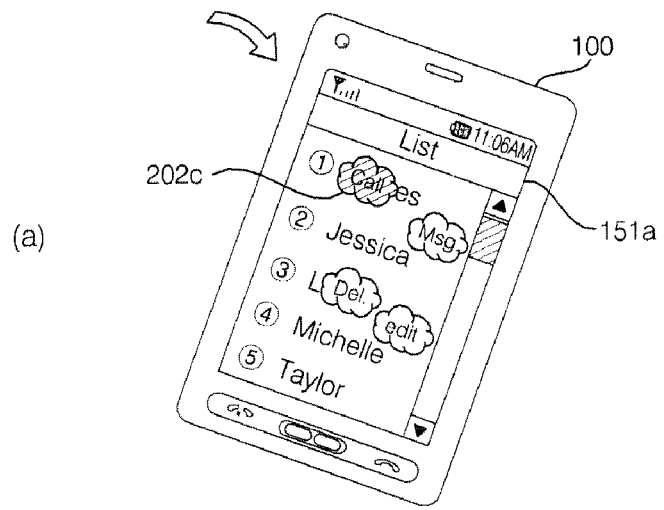
(a)
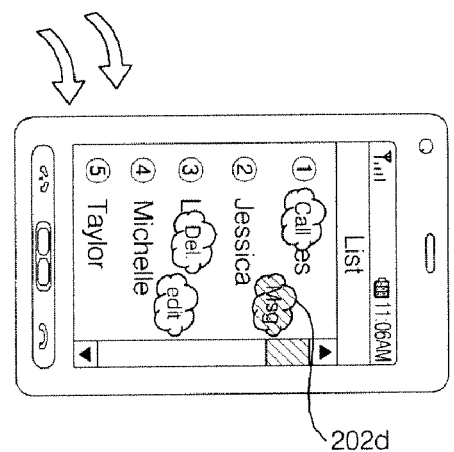
(b)
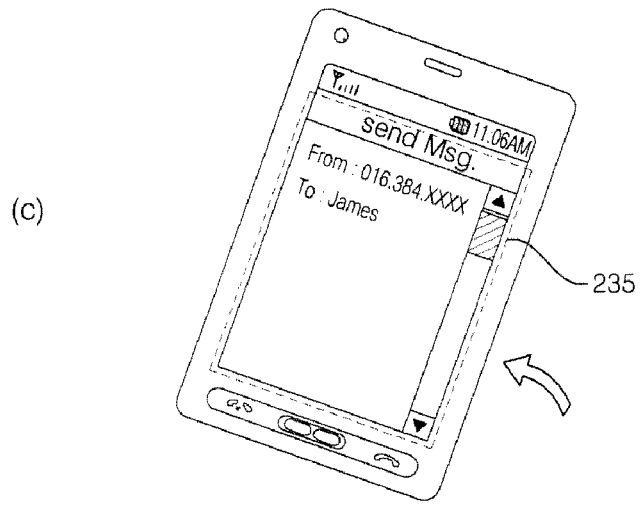
(c)

MOBILE TERMINAL AND OPERATION CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 2008-65471, filed Jul. 7, 2008, the contents of which are hereby incorporated by reference herein in their entirety.

FIELD OF THE INVENTION

The present invention relates generally to a mobile terminal, and in particular to controlling the mobile terminal based on the motion of the mobile terminal.

DESCRIPTION OF RELATED ART

Mobile terminals are portable devices, which can provide users with various services such as a voice calling service, a video calling service, an information input/output service, and a data storage service. As the types of services provided by mobile terminals diversify, an increasing number of mobile terminals are equipped with various complicated functions, such as capturing photos or moving pictures, playing music files or video files, providing game programs, receiving broadcast programs and providing wireless Internet services, thus evolving into multimedia players.

Various attempts have been made to realize such complicated functions as hardware devices or software programs. For example, various user interface (UI) environments, in which users are allowed to easily search for and choose desired functions, have been developed. In addition, demand for various designs for mobile terminals, such as a double-sided liquid crystal display (LCD) or a full touch screen, has steadily grown due to a growing tendency of considering mobile terminals as personal items that can represent personal identity.

However, a space for allocating a UI, such as a display device or a keypad, on a mobile terminal is limited, and thus, some UIs may increase a size of the mobile terminal, compromising the mobility and portability of the mobile terminal. Therefore, in order to efficiently use various functions provided by a mobile terminal, it is desirable to develop different ways to effectively control the operation of the mobile terminal.

SUMMARY OF THE INVENTION

An embodiment of the present invention relates to method of controlling a mobile terminal and includes displaying on a display of the mobile terminal a list comprising a plurality of items; identifying a selected item of the plurality items of the list; detecting movement of the mobile terminal; and displaying on the display a menu comprising a plurality of items that are each associated with a function which can be performed based upon information associated with the selected item, wherein the displaying of the menu is in response to the detecting of the movement of the mobile terminal.

Another embodiment of the present invention relates to a mobile terminal that includes a sensor configured to detect movement of the mobile terminal; a display configured to display a list comprising a plurality of items, wherein a selected item of the plurality items of the list is visually identified; and a controller configured to cause a menu to be displayed on the display in response to the detecting of the movement of the mobile terminal, wherein the menu comprises a plurality of items that are each associated with a function which can be performed based upon information associated with the selected item.

Yet another embodiment of the present invention relates to method of controlling a mobile terminal and includes displaying on a touchscreen display of the mobile terminal a list comprising a plurality of items; highlighting a selected item of the plurality items of the list; detecting movement of the mobile terminal; displaying on the display a menu comprising a plurality of items that are each associated with a function which can be performed based upon information associated with the selected item, wherein the displaying of the menu is in response to the detecting of the movement of the mobile terminal, wherein each of the plurality of items of the list relate to a contact list, and wherein the functions associated with the plurality of items of the menu are one of a calling function, a messaging function, a deleting function, or an editing function; detecting user contact with the display at a location which generally corresponds to a selected item of the plurality of items of the menu; and executing an application that is associated with the selected item for a particular one of the plurality of items of the list responsive to user-input dragging of the selected item to an area of the display which generally corresponds to the particular one of the plurality of items of the list.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIGS. 7 through 19 illustrate diagrams for explaining the methods illustrated in FIGS. 4 through 6.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term "mobile terminal", as used herein, may indicate a mobile phone, a smart phone, a laptop or notebook computer, a digital broadcast receiver, a personal digital assistant (PDA), a portable multimedia player (PMP), and a navigation device, among others.

Figure 1:
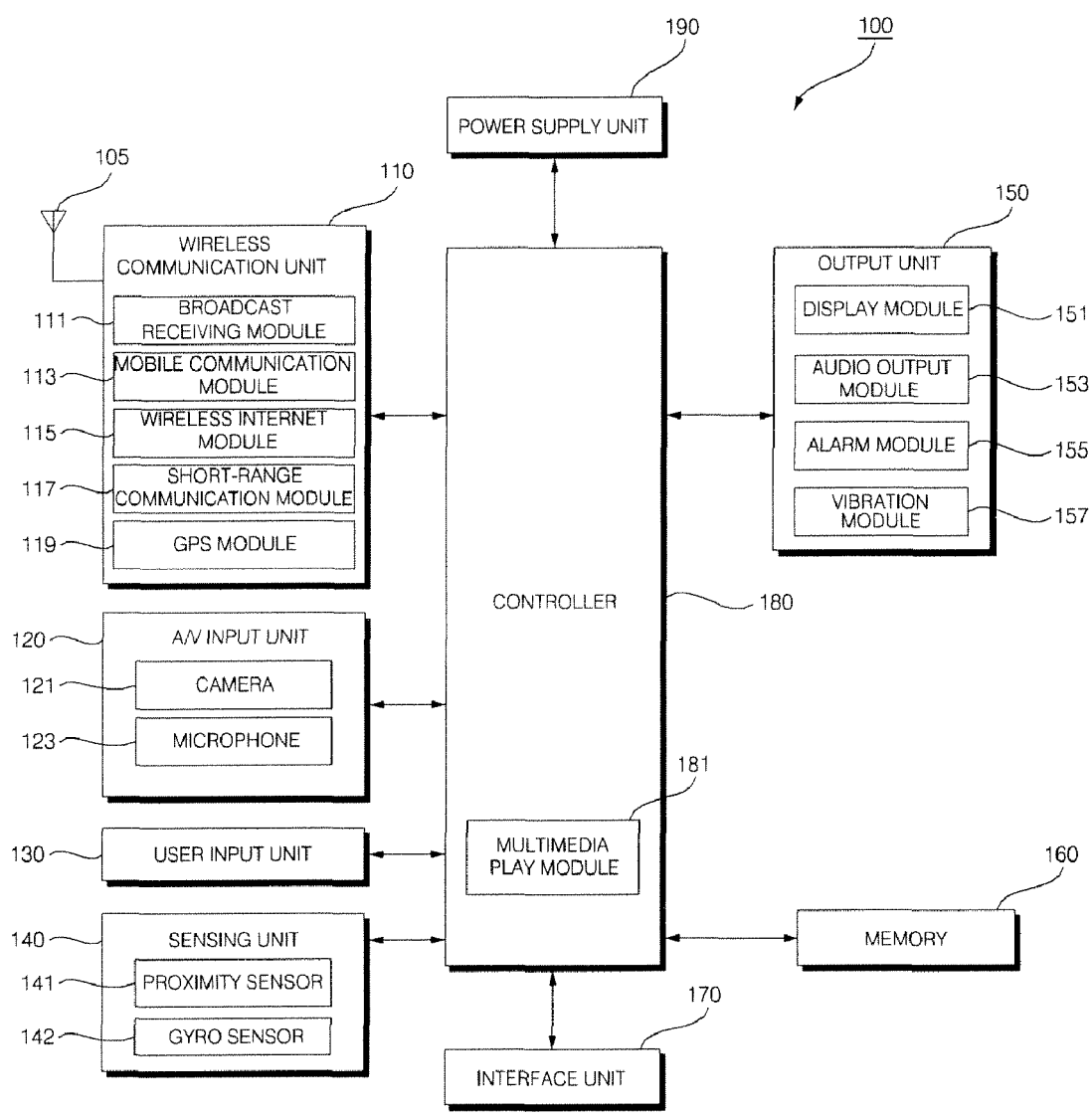
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some or all of these components may be divided into two or more smaller units.

The wireless communication unit 110 may include a broadcast receiving module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast receiving module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast receiving module 111 receives the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast receiving module 111 may be configured to be suitable for nearly all types of broadcasting systems other than those set forth herein. The broadcast signal and/or the broadcast-related information received by the broadcast receiving module 111 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 is a module for wirelessly accessing the Internet. The wireless Internet module 115 may be embedded in the mobile terminal 100 or may be installed in an external device.

The short-range communication module 117 is a module for short-range communication. The short-range communication module 117 may use various short-range communication techniques such as Bluetooth®, radio frequency identification (RFID), infrared data association (IrDA), ultra wideband (UWB), and ZigBee. The GPS module 119 may receive position information from a plurality of GPS satellites.

The A/V input unit 120 is used to receive audio signals or video signals. The A/V input unit 120 includes a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a-microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is open or closed, the position of the mobile terminal 100 and whether the mobile terminal 100 is placed in contact with a user, and generates a sensing signal for controlling the operation of the mobile terminal 100. For example, if the mobile terminal 100 is a slider-type mobile phone, the sensing unit 140 may determine whether the mobile terminal 100 is open or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance. The sensing unit 140 may include two or more proximity sensors 141.

The sensing unit 140 may also include a motion or other sensor (e.g., gyro-sensor 142) which senses the motion of an object using a suitable device, such as a gyroscope in the case of a gyro-sensor. Examples of the gyro-sensor 142 include an inertial sensor and an acceleration sensor. A gyroscope is generally classified as a mechanical gyroscope, a ring laser gyroscope, or an optic fiber gyroscope. The gyro-sensor 142 may sense the motion of the mobile terminal 100 and may thus provide a signal for controlling the mobile terminal 100. Although various embodiments will be described with regard to a gryo-sensor, such embodiments are not so limited and other types of motion sensors may alternatively or additionally be implemented.

The output unit 150 outputs audio signals, video signals and alarm signals. The output unit 150 may include the display module 151, an audio output module 153, an alarm module 155, and a vibration module 157.

The display module 151 displays various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module and an internal display module.

The audio output module 153 outputs audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 outputs an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output a signal upon receiving a call signal or a message. In addition, the alarm module 155 may receive a key signal and may output a signal as feedback to the key signal. Therefore, the user may be able to determine whether an event has occurred based on an alarm signal output by the alarm module 155. An alarm signal for notifying the user of the occurrence of an event may be output not only by the alarm module 155 but also by the display module 151 or the audio output module 153.

The vibration module 157 generates various types of vibrations having various intensities. The intensity, pattern, frequency, moving direction and moving speed of vibrations generated by the vibration module 157 may be determined by a vibration signal. The mobile terminal 100 may include two or more vibration modules 157.

The memory 160 stores various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory, such as a secure digital (SD) or extreme digital (XD) memory, a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 controls the operation of the mobile terminal 100. For example, the controller 180 may perform various control operations regarding making/receiving a voice call, transmitting/receiving data, or making/receiving a video call. The controller 180 may include a multimedia play module 181 that plays multimedia data. The multimedia play module 181 may be implemented as a hardware device and may be installed in the controller 180. Alternatively, the multimedia play module 181 may be implemented as a software program. The power supply unit 190 is supplied with power by an external power source or an internal power source and may supply power to the other components in the mobile terminal 100.

The exterior of the mobile terminal 100 will hereinafter be described in detail with reference to FIGS. 2 and 3. While the mobile terminal 100 is a bar-type mobile phone equipped with a full touch screen in these figures, the various embodiments presented herein are not restricted to the bar-type mobile phone and other types may be implemented (e.g., a folder-type mobile phone, a swing-type mobile phone, and a slider-type mobile phone).

Figure 2:
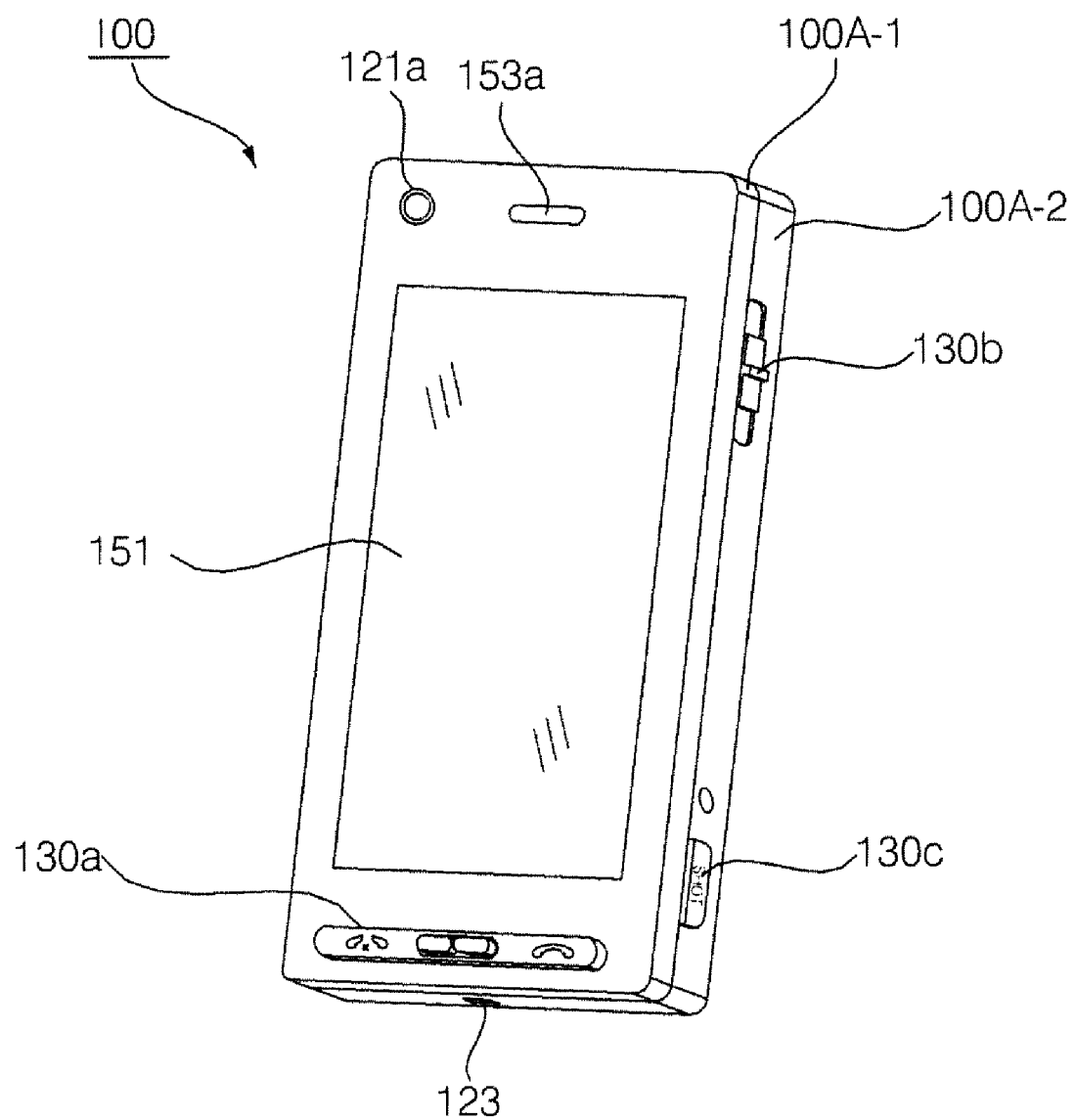
FIG. 2 illustrates a front perspective view of the mobile terminal shown in FIG. 1.

Referring to FIG. 2, the exterior of the mobile terminal 100 is defined by a front case 100A-1 and a rear case 100A-2. Various electronic products may be installed in the space between the front case 100A-1 and the rear case 100A-2. At least one intermediate case may be additionally disposed between the front case 100A-1 and the rear case 100A-2.

The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

In FIG. 2, the display module 151, a first sound module 153a, a first camera 121a and a first user input module 130a are disposed in the front case 100A-1. Second user input module 130b, third user input module 130c and microphone 123 are disposed on one side of the rear case 100A-2. The display module 151 may include an LCD or an OLED which can visualize information.

Since a touch pad is configured to overlap the display module 151 and thus to realize a layer structure, the display module 151 may serve as a touch screen. Thus, it is possible for the user to input information via the display module 151 simply by touching the display module 151.

The first sound module 153a may be implemented as a receiver or a speaker. The first camera 121a may be configured to capture a still image or video of the user. The microphone 123 may be configured to properly receive the voice of the user or other sounds.

The first user input module 130a and second and third user input modules 130b and 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick. The first user input module 130a may be used to input such commands as "start", "end", and "scroll", the second user input unit 130b may be used to choose an operating mode, and the third user input module 130c may serve as a hot key for activating certain functions of the mobile terminal 100.

When the user's finger or a pointer approaches the display module 151, the proximity sensor 141 may detect the user's finger or pointer and output a proximity signal. The proximity signal output by the proximity sensor 141 may vary according to the distance between the display module 151 and the user's finger or pointer. More specifically, the mobile terminal 100 may include more than one proximity sensor 141 having different sensing ranges. In this case, it is possible to determine the distance between the display module 151 and the user's finger or pointer by comparing a plurality of proximity signals respectively provided by the proximity sensors 141. In addition, it is possible to determine which part of the display unit 151 is being approached by the user's finger or pointer and whether the user's finger or pointer is moving within a close range of the display unit 151 by determining which of the proximity sensors 141 outputs a proximity signal. Therefore, the controller 180 may choose a touch key corresponding to a part of the display unit 151 approached by the user's finger and control the vibration module 157 to output a vibration signal corresponding to the chosen touch key.

If the user tilts or shakes the mobile terminal 100, the gyro-sensor 142 detects the motion of the mobile terminal 100. Thereafter, the gyro-sensor 142 generates a signal corresponding to the movement of the mobile terminal 100 and outputs the signal to the controller 180. Then, the controller 180 may acquire various information regarding the movement of the mobile terminal 100 such as the direction, angle, velocity, acceleration, and magnitude of the movement of the mobile terminal 100 and a current location of the mobile terminal from the signal generated by the gyro-sensor 142, for example.

The controller 180 may track the movement of the mobile terminal 100 based on the information acquired from the signal generated by the gyro-sensor 142. The type of information that can be acquired from the signal generated by the gyro-sensor 142 may vary according to the type of the gyro-sensor 142. Thus, a gyro-sensor 142 capable of providing desired information may be included in the mobile terminal 100. The mobile terminal 100 includes at least one gyro-sensor 142. The controller 180 may control the gyro-sensor 142 to be driven only when a certain application is executed.

Figure 3:
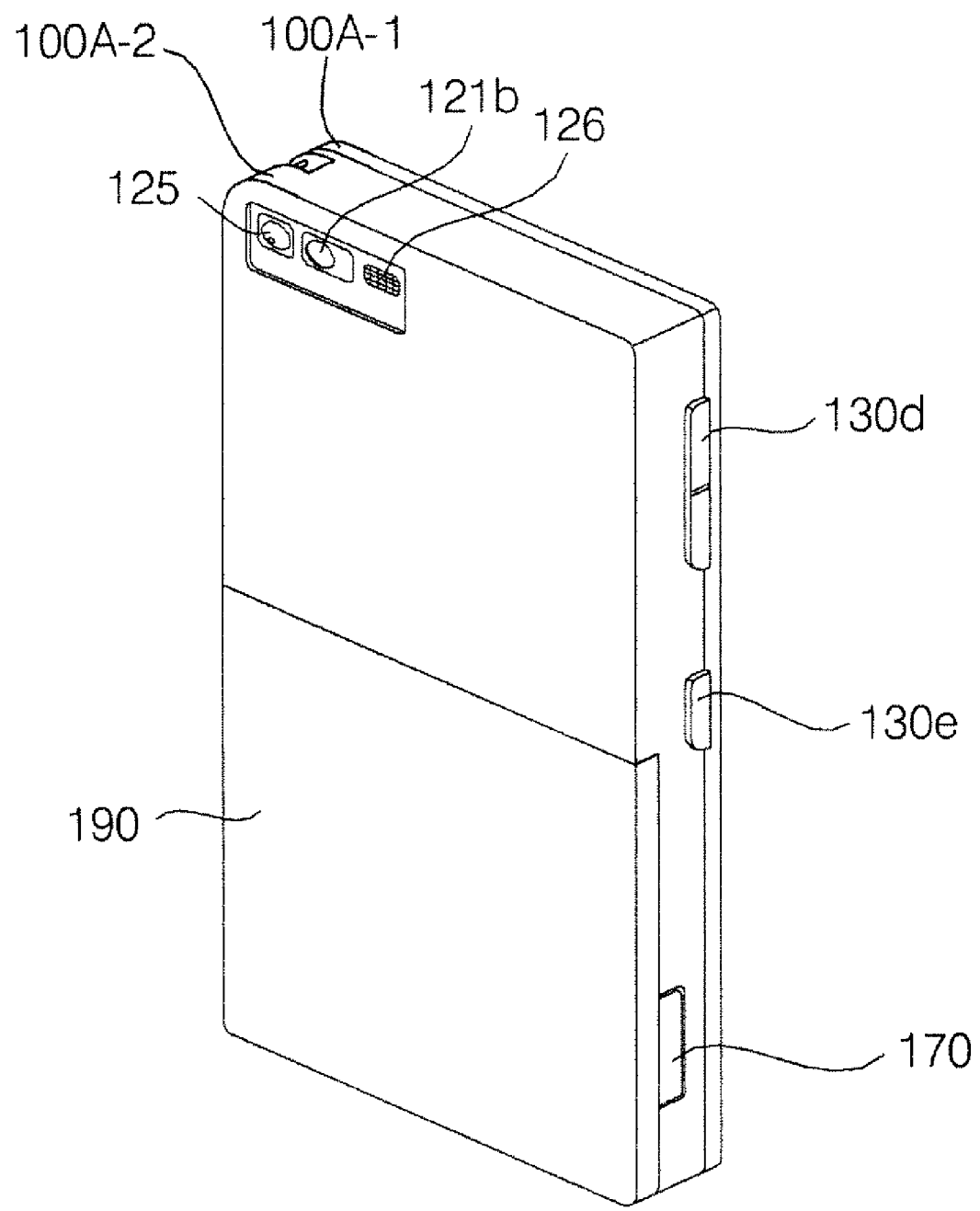
FIG. 3 illustrates a rear perspective view of the mobile terminal shown in FIG. 1.

FIG. 3 illustrates a rear perspective view of the mobile terminal 100 shown in FIG. 2. Referring to FIG. 3, fourth and fifth user input modules 130d and 130e and the interface unit 170 may be disposed on one side of the rear case 100A-2. A second camera 121b may be disposed at the rear of the rear case 100B-2.

The second camera 121b may have a different photographing direction from that of the first camera 121a shown in FIG. 2. In addition, the second camera 121b may have a different resolution from that of the first camera 121a. For example, the first camera 121a may be used to capture an image of the face of the user and then readily transmit the captured image during a video call. Thus, a low-resolution camera may be used as the first camera 121a. The second camera 121b may be used to capture an image of an ordinary subject. Given that images captured by the second camera 121b generally do not need to be transmitted, a high-resolution camera may be used as the second camera 121b.

A mirror 125 and a camera flash 126 may be disposed near the second camera 121b. The user may look in the mirror 125 to prepare himself or herself for taking a self-shot. The camera flash 126 may illuminate a subject when the second camera 121b captures an image of the subject.

A second audio output module may be additionally provided in the rear case 100A-2. The second audio output module may realize a stereo function along with the first audio output module 153a. The second audio output module may also be used during a speaker-phone mode.

An antenna for receiving a broadcast signal may be disposed on one side of the rear case 100A-2. The antenna may be installed so as to be able to be pulled out of the rear case 100A-2. The interface unit 170 may serve as a path for allowing the mobile terminal 100 to exchange data with data. For example, the interface unit 170 may be a connection port for connecting an earphone, a short-range communication port, or a power supply port for supplying power to the mobile terminal 100. Alternatively, the interface unit 170 may be a card socket for accommodating an exterior card such as a SIM card, a UIM card or a memory card.

A power supply unit may be disposed in the rear case 100A-2. The power supply unit may be a rechargeable battery and may be coupled to the rear case 100A-2 so as to be attachable to or detachable from the rear case 100A-2.

The second camera 121b is illustrated in FIG. 3 as being disposed in the rear case 100A-2, but the present invention is not restricted to this configuration. In addition, the first camera 121a may be rotatable to cover the photographing direction of the second camera 121b. In this case, the second camera 121b may be optional.

Figure 4:
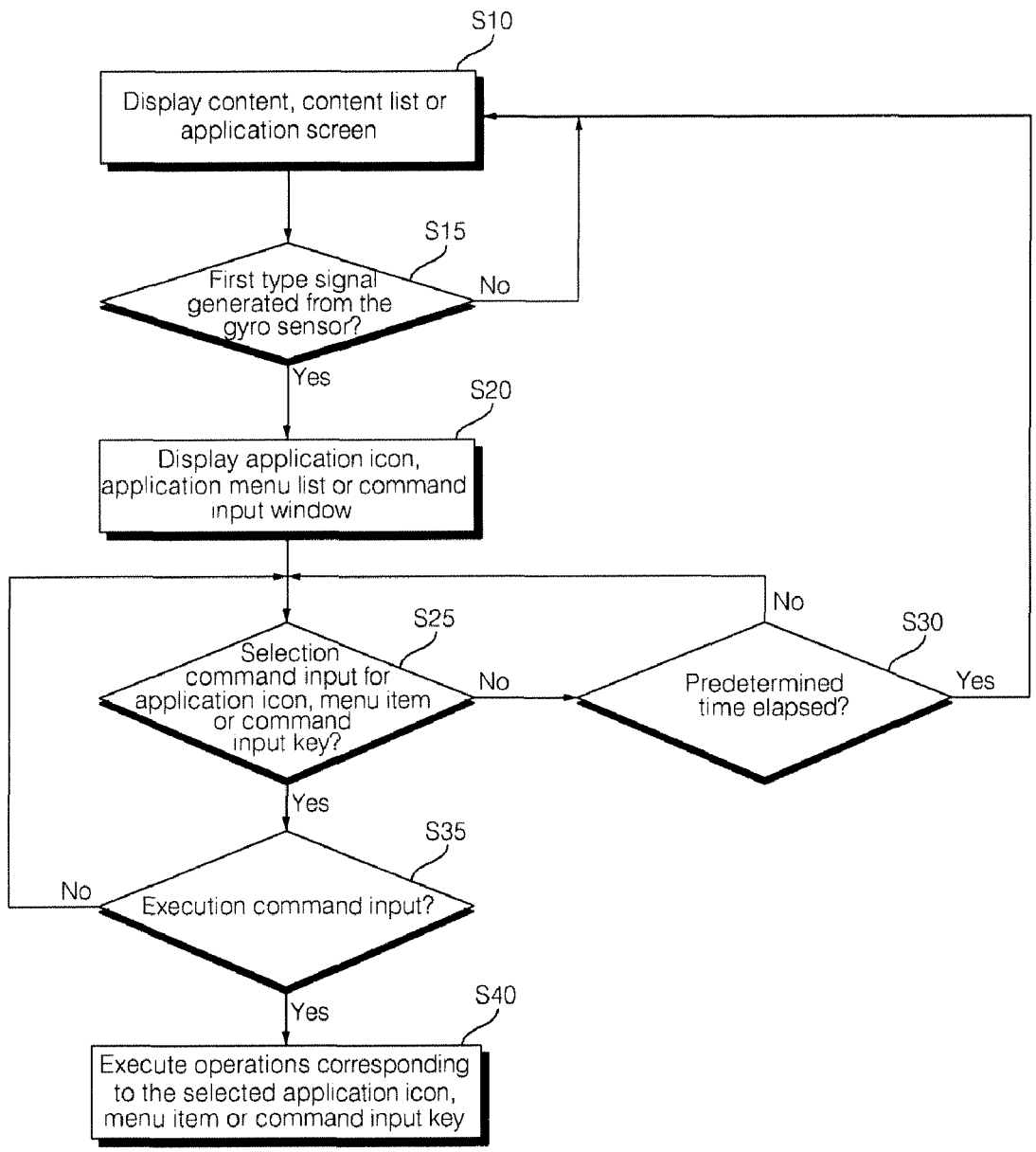
FIGS. 4 through 6 are flowcharts illustrating operation of a mobile terminal according to various embodiments of the present invention.
Figure 5:
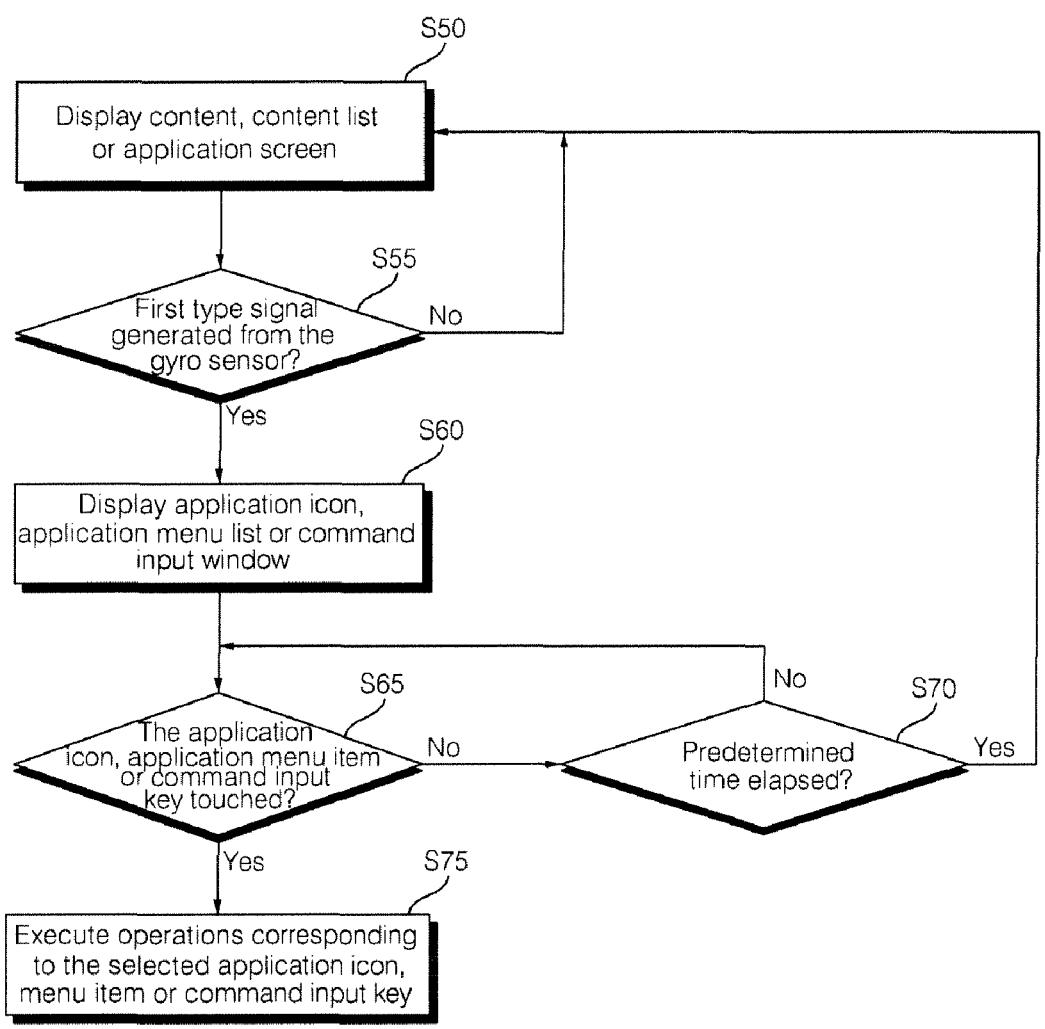
Figure 6:
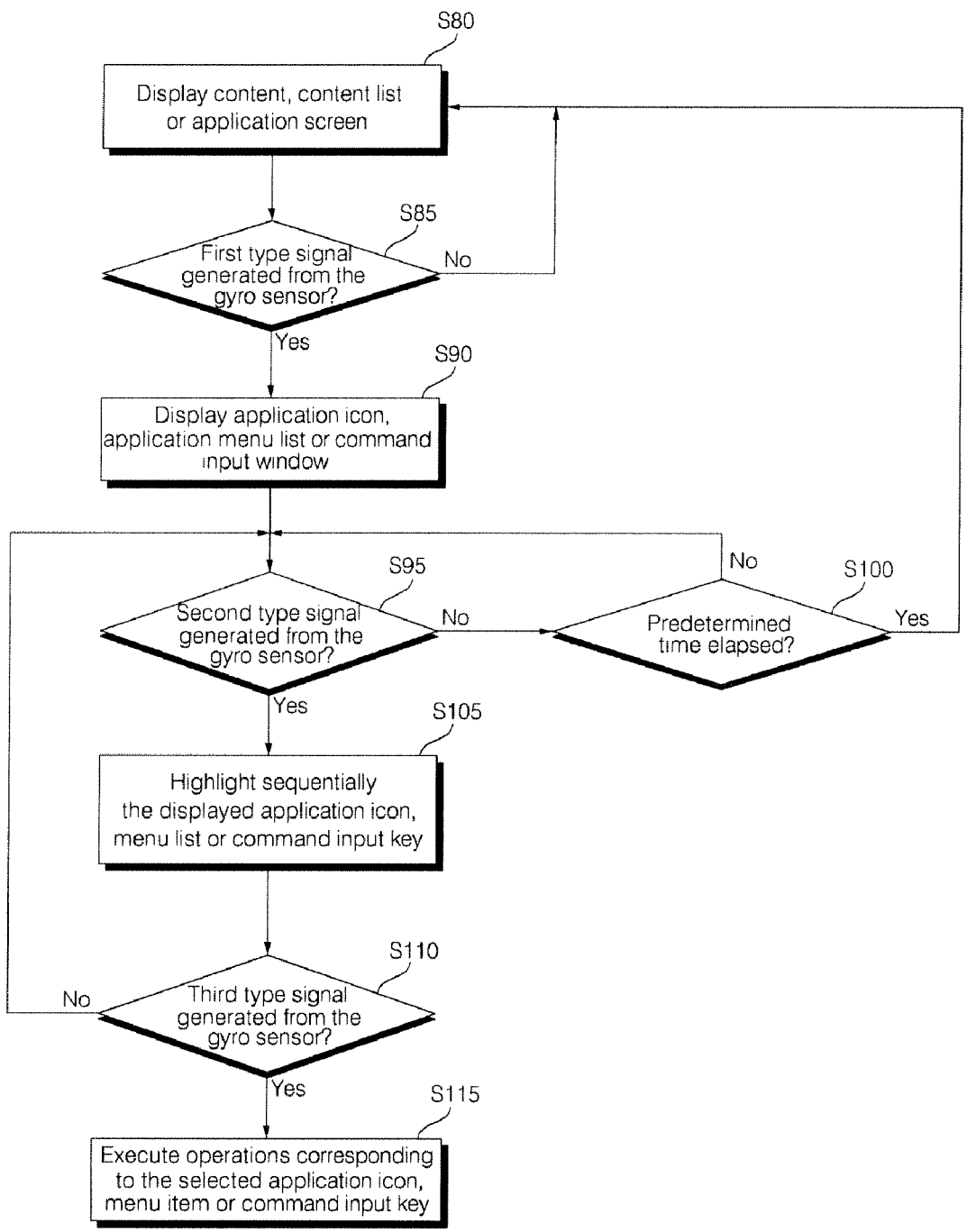

Referring to FIGS. 4 through 6, a method of controlling a mobile terminal according to an embodiment of the present invention will be described. The gyro-sensor 142 of the mobile terminal 100 detects the motion of the mobile terminal 100 and generates a signal corresponding to the detected motion. Thereafter, the gyro-sensor 142 outputs the generated signal to the controller 180. The controller 180 may detect motion information of the mobile terminal 100 from the signal output by the gyro-sensor 142. The motion information detected by the controller 180 may vary according to the type of the gyro-sensor 142 or the type of an operation performed by the mobile terminal 100.

In the embodiments according to FIGS. 4 and 5, a preset operation may be performed according to motion information of the mobile terminal 100, but further embodiments are also possible.

Referring to FIG. 4, the controller 180 displays at least one of content, content list and application screen on a display area on the display module 151. The content may be web page(s), document(s), picture file(s), A/V file(s) which could be displayed on the mobile terminal 100. Sound(s) included in the content may be output through audio output module 153. The content list is a list including a plurality of content items. Each content item of the content list may correspond to certain content. The content item may be a name of a file or an icon corresponding to the content. The application screen is a screen displayed on the display area when a certain application is executed by the controller 180. For example, when a document editing application is being executed on the mobile terminal 100, the controller 180 displays a document editing screen on the display area. If a camera application is being executed on the mobile terminal 100, the controller 180 displays a picture or moving picture which is currently being captured by the camera 121 on the display area.

The controller 180 detects whether the gyro-sensor 142 generates a first type signal (S15). The gyro-sensor 142 generates the first type signal corresponding to the movement of the mobile terminal 100. For example, the controller 180 may activate the gyro-sensor 142 to generate signals when the content, content list or certain application screen is displayed on the display module 151 to prevent possible malfunction of the gyro-sensor 142. The controller 180 obtains movement information with regard to the mobile terminal 100 from the generated first type signal.

The movement information of the mobile terminal 100 may include angle information when the mobile terminal 100 is rotated. The movement information of the mobile terminal 100 may also include intensity of shaking or a moving pattern when the mobile terminal 100 is shaken or moved. The movement information may differ according to the type of gyro-sensor 142 installed in the mobile terminal 100. The movement information may be set to correspond to a certain execution command to control the mobile terminal 100 upon detection of the motion of the mobile terminal 100.

The movement information detected from the first type signal may correspond to a command for displaying an application icon, application menu list or command input window. Accordingly, the controller 180 displays a certain application icon, application menu list or command input window on the display area based upon the movement information (S20).

The displayed application icon, application menu list or command input window corresponds to the content, content list or application screen that was displayed prior to the display of the application icon, application menu list or command input window. The application icon or application menu list may correspond to an application related to the content, content list or application screen. The command input window may enable input of a command relating to the control of the content, content list or application screen being displayed.

For example, in one embodiment, if a phone-book list is being displayed in S10, the application icon(s) may include icon(s) corresponding to phone call request application, message transmission application, or phone-book delete/edit/save application. In another embodiment, if a phone-book list is being displayed in S10, the application icon(s) may include icon(s) corresponding to applications for displaying information regarding the highlighted item on the phone-book list. The information may be a number of phone calls sent to or received from the phone number in the highlighted item, total calling time or a number of messages transmitted to or received from the phone number.

In another embodiment, if a picture or moving picture currently being captured by the camera 121 is being displayed on the display area, the application icon(s) may include icons (s) corresponding to applications for changing the picture taking mode. For example, the picture taking mode may include black and white mode, color mode or sepia mode.

In another embodiment, if a web page is being displayed in S10, the application icon may be an icon corresponding to an application which can load the web page corresponding to a web address registered for a hot key. The hot key enables loading of the web page corresponding to the web address registered for the hot key. Hence, in order to load the web page, a user does not need to enter the web address manually and can select the hot key for the web address, thus displaying the web page corresponding to the web address on the display automatically.

In another embodiment, if an idle screen, which is a screen displayed on the display area when the mobile terminal 100 is in an idle mode, is displayed in S10, the application icon may be an icon corresponding to an application registered for the hot key menu. The hot key menu is an application menu corresponding to an application that can be executed when executing the hot key application.

In another embodiment, if a broadcasting screen is displayed in S10, the application icon may be at least one of icons corresponding to applications such as an application to display channel information of the broadcasting screen being displayed, an application to record certain channels, an application to change channels, and an application to tune into the channel which has been registered for a hot key.

In another embodiment, if a picture is displayed in S10, the application icon may be at least one of icons corresponding to applications such as an application to transmit pictures which are being displayed in S11, an application to save the picture being displayed as a background screen, am application to delete the picture being displayed, and an application to edit the picture being displayed.

In another embodiment, if an MP3 player screen is displayed in S10, the application icon may be at least one of icons corresponding to applications that can be executed while the MP3 player application is being executed, for example, a message transmitting application, a document editing application, and an Internet access application.

In another embodiment, if a screen related to a message transmission application is being displayed in S10, the command input window may include a keypad, which can be used to input phone numbers, and keyboard which can be used to input text messages.

Hence, in this embodiment, the application icon, application menu list, or command input window may vary according to the content, content list and application screen being displayed on the mobile terminal 100. Notwithstanding the above described embodiments, the present invention is not limited to such embodiments described herein.

The controller 180 may display the application icon, application menu list and command input window on the display area semi-transparently. The controller 180 may also display the application icon, application menu list or command input window such that the displayed application icon, application menu list or menu input window does not overlap with texts or images included in the content or content list. Thus, a user can identify the content or content list when the application icon, application menu list or command input window is displayed. Further, the controller 180 may apply animation effects on the application icon such that the location, shape or color of the application icon being displayed on the display area may change over time.

The controller 180 changes at least one of the type, number, sharpness, color, shape, display area, and moving direction or the speed of the display area of the application icon over time to correspond to the rotation, shaking, moving pattern of the mobile terminal 100. For example, the controller 180 may change the type of application icon displayed on the display area according to the rotation direction of the mobile terminal 100. Further, the controller 180 may vary the number of application icons displayed on the display area according to the rotation angle of the mobile terminal 100.

The controller 180 detects the input selection command (S25). The selection command may be a command for selecting a certain command input key among the plurality of command input keys displayed on the command input window. The selection command may also be a command for selecting a certain application icon among the displayed application icons or a certain menu item in the application menu list. A user may input the selection command via the user input module 130. The selection command may also be entered via an operate side key, front key or soft key displayed on the display area. When the display area is displayed on a touch screen, the user may touch the touch screen to input the selection command. When the mobile terminal 100 is equipped with the gyro-sensor 142, the user may input the selection command by moving the mobile terminal 100.

When no selection command is detected over a predetermined or threshold time, the controller 180 deletes the application icon, menu list or command input window from the display area (S30). When the selection command is detected within the threshold time after the displaying of the application, application menu list or command input window, the controller 180 detects the input of an execution command (S35). The user may input the execution command via the user input module 130.

The controller 180 executes an operation corresponding to the selected application icon, application menu item or command input key when the execution command is detected (S40). The operation may be an application corresponding to the selected application icon or command input corresponding to the selected application menu list or command input key.

Referring to FIG. 5, in S50, S55, and S60, the controller 180 displays content, a content list or an application screen on a touch screen. When the gyro-sensor 142 generates a first type signal, the controller 180 displays an application icon, application menu list or command input window.

The controller 180 detects a touch input on a certain icon, menu item or command input key among the application icons, application menu list or command input window displayed on the touch screen (S65). Upon detecting the touch input, the controller 180 detects the input of a selection command or execution command. The controller 180 determines the input of the selection command or execution command according to a pattern of the detected touch input. For example, when an application icon is touched shortly or only once within a predetermined time, the mobile terminal 100 recognizes the touch input as a selection command input for the touched application icon. However, when the application icon is touched for a long time or twice within the predetermined time, the mobile terminal 100 recognizes the touch input as an execution command input for the touched application icon.

When no touch is detected within the predetermined time, the controller 180 deletes the displayed application icon, application menu list or command input window from the touch screen (S70). The controller 180 executes an operation corresponding to the touch detected application icon, application menu item or command input key when the touch input is detected within the predetermined time according to a predetermined pattern (S75).

Referring to FIG. 6, in S80, S85, and S90, the controller 180 displays content, a content list or an application screen on the display area. When the controller 180 detects the first type signal generated from the gyro-sensor 142, the controller 180 displays an application icon, application menu list or command input window on the display area.

The controller 180 detects whether the gyro-sensor 142 generates a second type signal (S95). For example, the gyro-sensor 142 generates the second type signal when the mobile terminal 100 rotates at a predetermined angle after the generation of the first type signal.

When the second type signal is not generated within the predetermined time after the display of the application icon, application menu list or command input window (S100), the controller 180 deletes the displayed application icon, application menu list or command input window from the display area.

When the controller 180 detects the generation of the second type signal, the controller 180 highlights, sequentially, the application icon, menu items on the menu list or command input key on the command input window (S105). The user acknowledges the selection of the application icon, application menu item or command input key through the highlighted application icon, menu items or command input key.

The controller 180 detects whether a third type signal is generated from the gyro-sensor 142 (S110). For example, the gyro-sensor 142 generates the third type signal when the mobile terminal 100 moves back to the location before generating the second type signal. In the present embodiment, the first, second and third type signals are generated sequentially from the gyro-sensor 142. However, the first, second and third signals may be a set to represent a certain type of a signal generated from the gyro-sensor 142 according to the movement of the mobile terminal 100. The present invention is not limited to the above described embodiments.

The controller 180 executes an operation when the third type signal is generated from the gyro-sensor 142 (S115). The operation may be an application corresponding to the selected application icon. The operation may also be an input command corresponding to the selected menu item or command input key. In this embodiment, the selected application icon, menu item or command input key may be highlighted.

In general, various examples will be described herein with regard to detecting movement of the mobile terminal. Examples include detecting a shaking of the mobile terminal, detecting rotation of the mobile terminal about a particular axis of rotation which exceeds a threshold amount of rotation, detecting threshold levels of acceleration and/or deceleration of the mobile terminal over a defined time period, and the like.

Figure 7:
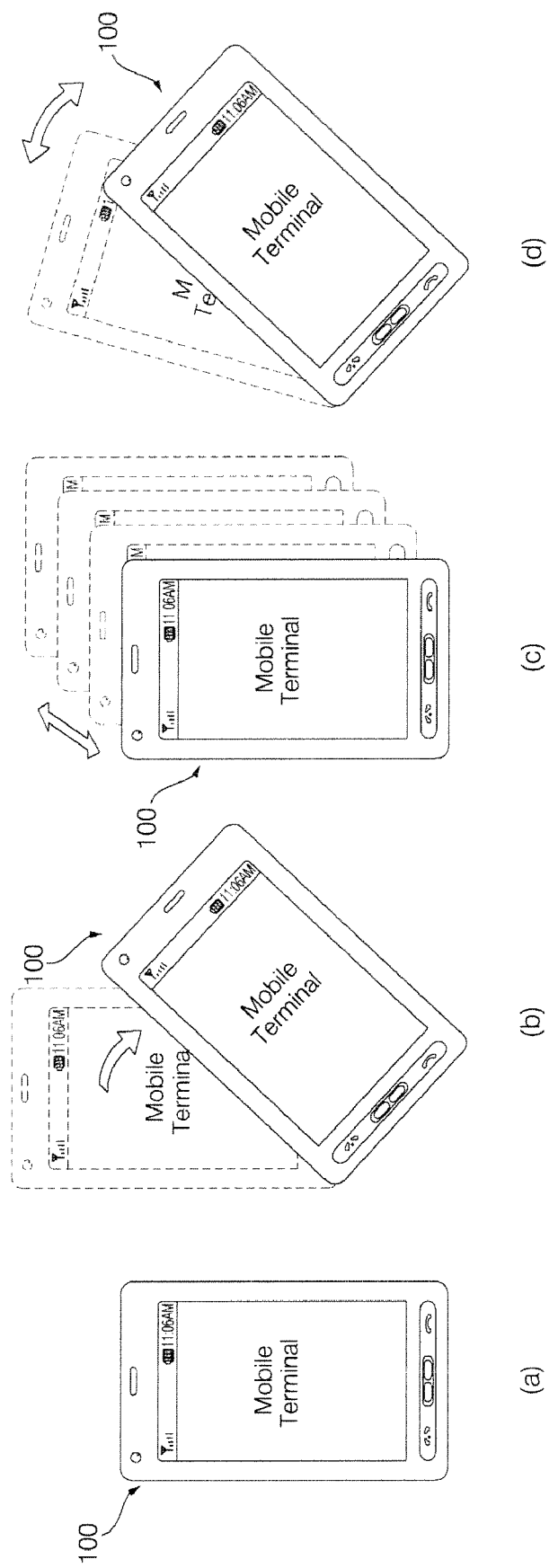

Referring to FIG. 7, a set of movements of the mobile terminal 100 is detected by the gyro-sensor 142 which generates signals according to the detected movements. The movements of the mobile terminal 100 described in FIG. 7 are exemplary and the movements of the mobile terminal 100 in the present invention are not limited to such movements.

In FIG. 7, if the mobile terminal 100 positioned as shown in (a) rotates to the position shown in (b), moves back and forth as shown in (c), or is shaken to the right and left as shown in (d), the gyro-sensor 142 detects the movements of the mobile terminal 100 and generates a signal. The signal generated from the gyro-sensor 142 is transmitted to the controller 180.

The controller 180 detects the movement of the mobile terminal 100 when the signal generated from the gyro-sensor 142 is detected. The controller 180 may determine the pattern of the movement of the mobile terminal 100. The determined pattern of the movement may be a rotation angle or direction when the mobile terminal 100 is rotated, the intensity or duration when the mobile terminal 100 is shaken, a direction, a speed, a number, or a pattern when the mobile terminal 100 is moved or the position of the mobile terminal 100. The controller 180 detects the movement information corresponding to the operation about to be executed from the signal generated from the gyro-sensor 142.

In this embodiment, the controller 180 executes an operation responsive to the signal generated from the gyro-sensor 142 when the mobile terminal 100 is rotated at a preset angle. However, the specific operation executed by the controller 180 according to the specific movement information of the mobile terminal 100 may vary and the present invention is not limit to such specific operation disclosed herein.

Figure 8:
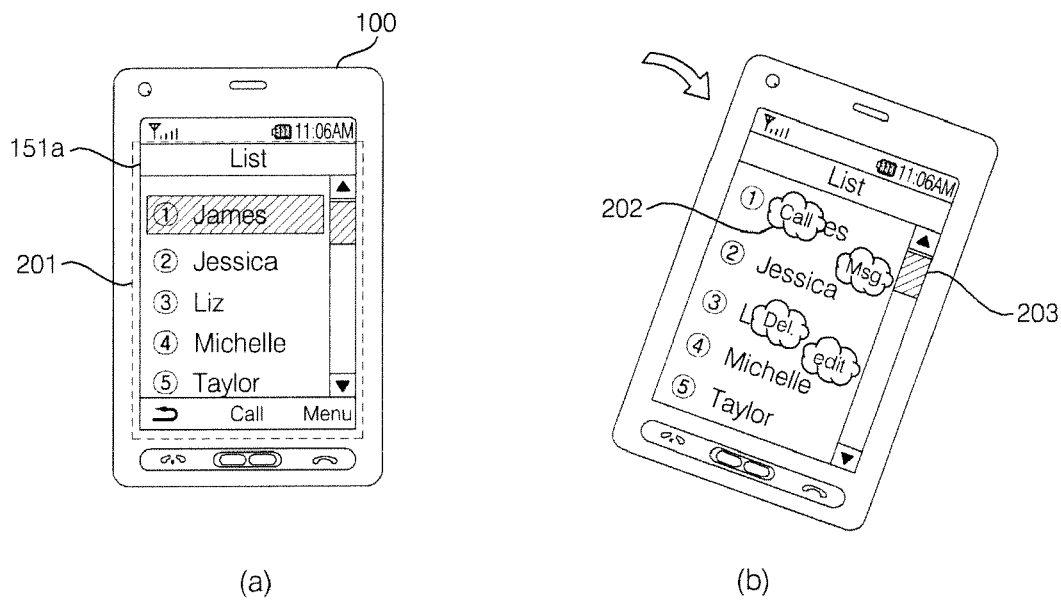

Referring to FIG. 8(a), a phone book list 201 is displayed on the display area 151a. When the mobile terminal 100 rotates to a preset angle, the gyro-sensor 142 generates the first type signal. Upon the detection of the first type signal, the controller 180 displays the application icon 202, as shown in FIG. 8(b). The application icon 202 corresponds to an executable application related to the phone book. After the application icon 202 is displayed, a user may move the scroll bar 203 up and down to check other information on the phone book list 201. However, when the display area 151a is on a touch screen, the controller 180 may touch lock the display area 151a excluding an area where the application icon is displayed such that the user may not move the scroll bar 203 up and down.

The type, number, sharpness, color, shape, display location on the display area 151a, moving direction or speed of the display location may vary to correspond to the movement information of the mobile terminal 100. The movement information may be detected from the first type signal generated from the gyro-sensor 142.

The phone book list exemplified in FIG. 8(a) is one of the contents that may be displayed on the display area 151a and does not limit the scope of the present invention. Also, the controller 180 may display an application menu list on the display area 151a instead of the application icon 202. The user may select a menu item corresponding to the application the user wishes to execute. The menu item may be one of the items on the displayed application menu list. Hence, the controller 180 may display an application icon or application menu list for the user to select the application to be executed.

Figure 9:
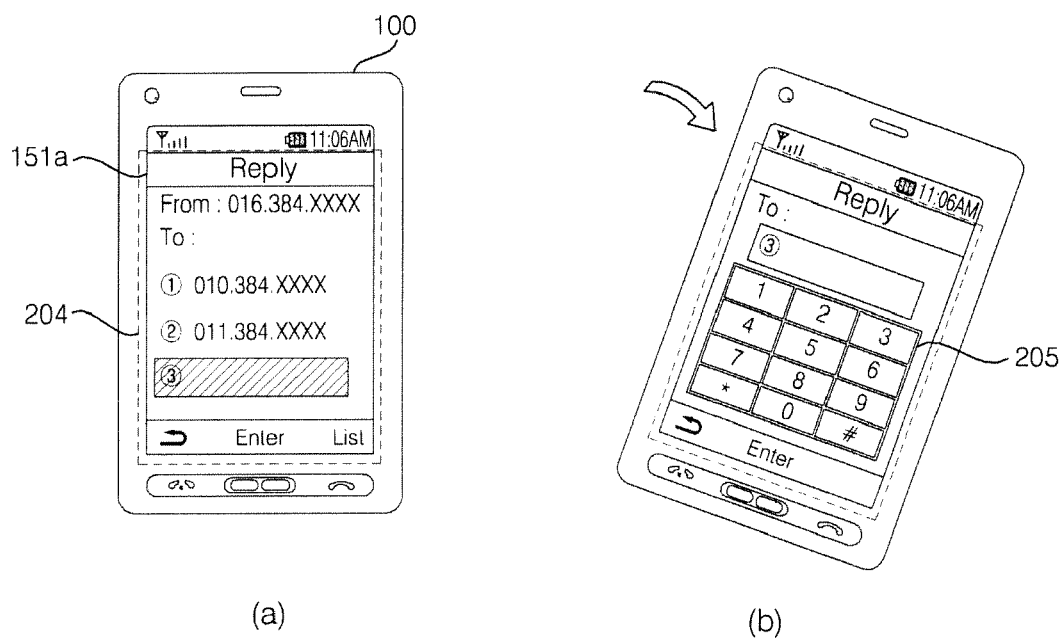

In FIG. 9(a), a message transmission application screen 204 is displayed in the display area 151a. When a user rotates the mobile terminal 100 to a preset angle as shown in FIG. 9(b), the gyro-sensor 142 generates a first type signal. The controller 180, upon detection of the first type signal, displays a command input window in the display area. The command input window is related to the application which is being executed when the mobile terminal 100 is rotated. In this embodiment, the controller 180 displays the keypad 205 on the display area 151a as shown in FIG. 9(b). The user may input numbers via the keypad 205 to reply to a received message.

In another embodiment, the controller 180 may display memo editing application screen on the display area 151a. When the first type signal is generated from the gyro-sensor 142 while the memo editing application is being executed, the controller 180 displays keyboard on the display area 151a. The user may input text via the displayed keyboard to edit a memo. Likewise, the type of command input window may vary according to the type of application being executed on the mobile terminal 100.

Figure 10:
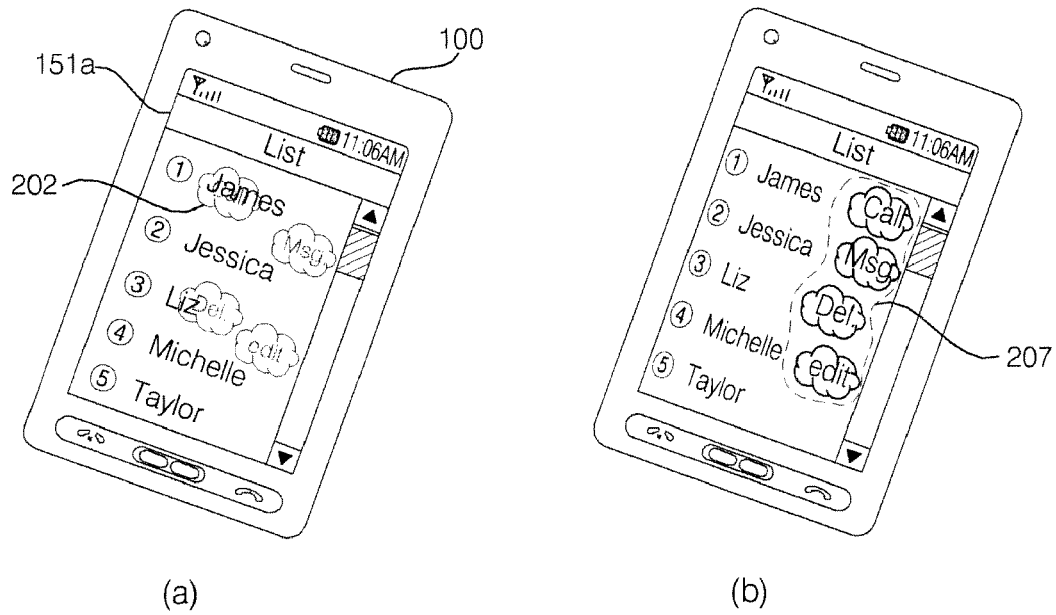

In FIG. 10(a), the application icon 202 is displayed on the phone book list semi-transparently. Hence, the user may see through the application icon 202 to check the phone book list. In FIG. 10(b), the controller 180 displays the application icon 207 such that the displayed icon(s) does not overlap the text included in the phone book list. Hence, the application icon 207 and the phone book list are clearly distinguishable on the display area 151a.

When there are images or other command input icons displayed on the display area 151a before the display of application icon(s) 202 or 207, the controller 180 may display the application icon(s) 202 or 207 semi-transparently or beside the images, or other command input icons. Therefore, the user may check the content, content list or application screen even after the display of the application icon, application menu list or command input window.

Figure 11:
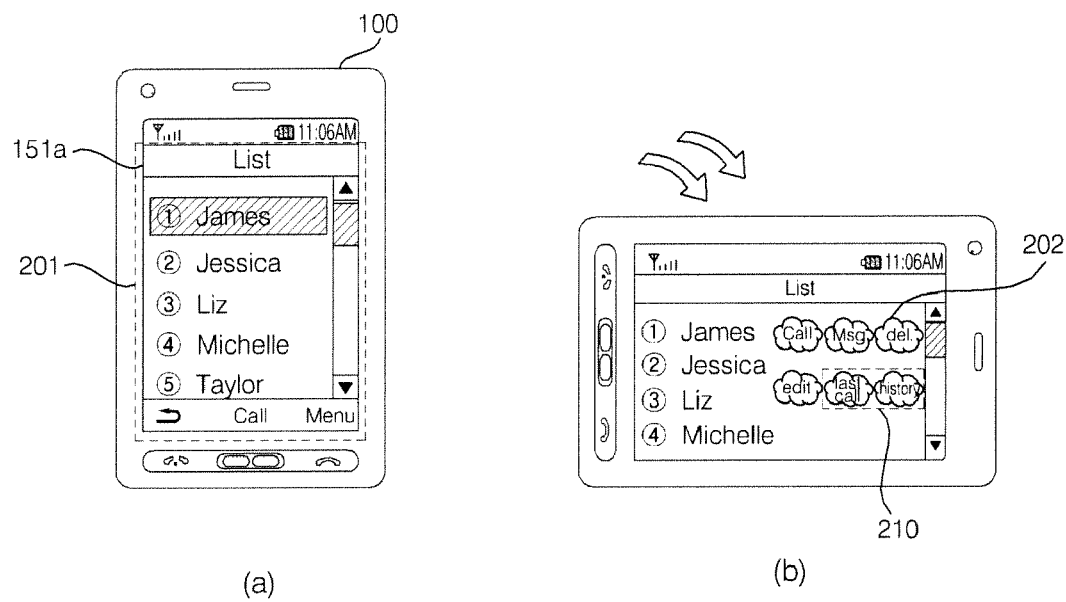

In FIG. 11(a), the phone book list 201 is displayed on the display area 151a. When a user rotates the mobile terminal 100 about 90 degrees to the right, the gyro-sensor 142 generates a first type signal. The controller 180 may determine the movement of the mobile terminal 100 through the movement information detected from the first type signal. In this embodiment, the controller 180 determines that the mobile terminal 100 is rotated 90 degrees to the right.

The controller 180 may vary the type or number of the application icons being displayed. The type or number of the application icons may correspond to the movement information of the mobile terminal 100. Hence, when the rotation angle increases, the controller 180 may increase the number of application icons being displayed. For example, additional application icon(s) 210 is displayed on the display area 151a, as shown in FIG. 11(b). In FIG. 11(b), the controller 180 displays the additional application icon 210 since the rotation angle of the mobile terminal 100 has increased compared to the rotation angle of the mobile terminal 100 shown in FIG. 8(b).

In addition to the embodiment described in FIGS. 11(a) and (b), the controller 180 may vary the type, sharpness, shape, color, display location on the display area 151a or the moving direction or speed of the display location to correspond the rotation, shaking or moving pattern of the mobile terminal 100.

In FIGS. 12(a) and (b), the number of displayed application icon(s) varies according to a number of the shaking of the mobile terminal 100. The shaking of the mobile terminal 100 includes one or more motions of moving and/or rotating the mobile terminal 100 to a certain angle and/or position, and then rotating and/or positioning the mobile terminal 100 back to the same or substantially the same position or angle.

Referring to FIG. 12(a), when a user shakes the mobile terminal 100 once, the gyro-sensor 142 generates a first type signal. The controller 180 determines the movement information from the generated first type signal. The movement information which may be determined from the detected signal generated from the gyro-sensor 142 may be the number of shaking, or speed or angle of the mobile terminal 100, and combinations thereof.

When the mobile terminal 100 determines that the user has shaken the mobile terminal 100 once, the controller 180 displays two application icons 202 and 203 on the display area 151a, as shown in FIG. 12(a). When the user shakes the mobile terminal 100 twice, the controller 180 determines that the mobile terminal 100 has been shaken twice from the generated first type signal and displays an additional application icon 211 on the display area 151a, as shown in FIG. 12(b). As exemplified in FIGS. 12(a) and (b), the number of application icon(s) may vary to correspond to the number of shaking of the mobile terminal 100.

Further, the controller 180 may vary at least one of type, display location on the display area 151a and moving direction or speed of the display location of the application icon to correspond to the shaking speed or angle. For example, when the controller 180 determines that the mobile terminal 100 has been shaken once, the mobile terminal 100 may display application icon(s) corresponding to the applications such as a call request application, message transmission or received message check application, item delete application, or item edit application.

In another embodiment, when the controller 180 determines that the mobile terminal 100 has been shaken twice, the mobile terminal 100 may display application icon(s) corresponding to the applications such as an application displaying the number of calls sent or received from a highlighted item on the phone book list, total phone call time with the highlighted item, total number of messages sent or received from the highlighted item, or content of a message which have been sent to or received from the highlighted item. Likewise, the type of application icon(s) being displayed upon detection of the first type signal may vary to correspond to the detected movement information.

In FIGS. 13(a) and (b), the application icon's display location on the display area 151a is changed according to the rotation angle of the mobile terminal 100. Referring to FIG. 13(a), the gyro-sensor 142 generates a first type signal when the mobile terminal 100 is shaken twice. The controller 180 detects the shaking of the mobile terminal 100 when the mobile terminal 100 has been shaken twice by detecting the first type signal. The controller 180 displays application icon(s) 211 in addition to the application icons 202 and 203 such that the number of the displayed application icon(s) corresponds to the number of the shaking of the mobile terminal 100. The controller 180 moves the displayed application icon(s) to correspond to the first type signal generated from the gyro-sensor 142 and determines that the mobile terminal 100 has been shaken twice and remains in a rotated position.

Referring to FIG. 13(b), the controller 180 moves the locations on which the application icons 202, 203, and 211 are displayed. The moving direction of the application icons 202, 203, and 211 corresponds to the rotation direction of the mobile terminal 100. Hence, as shown in FIG. 13(b), the application icon(s) move to the right on the display area 151a.

If the user rotates the mobile terminal 100 to the left, rather than to the right, as shown in FIG. 13(b), the controller 180 moves the application icons 202, 203, and 211 to the left on the display area 151a. The moving direction or speed of the application icons 202, 203, and 211 corresponds to the movement information of the mobile terminal 100.

Figure 14:
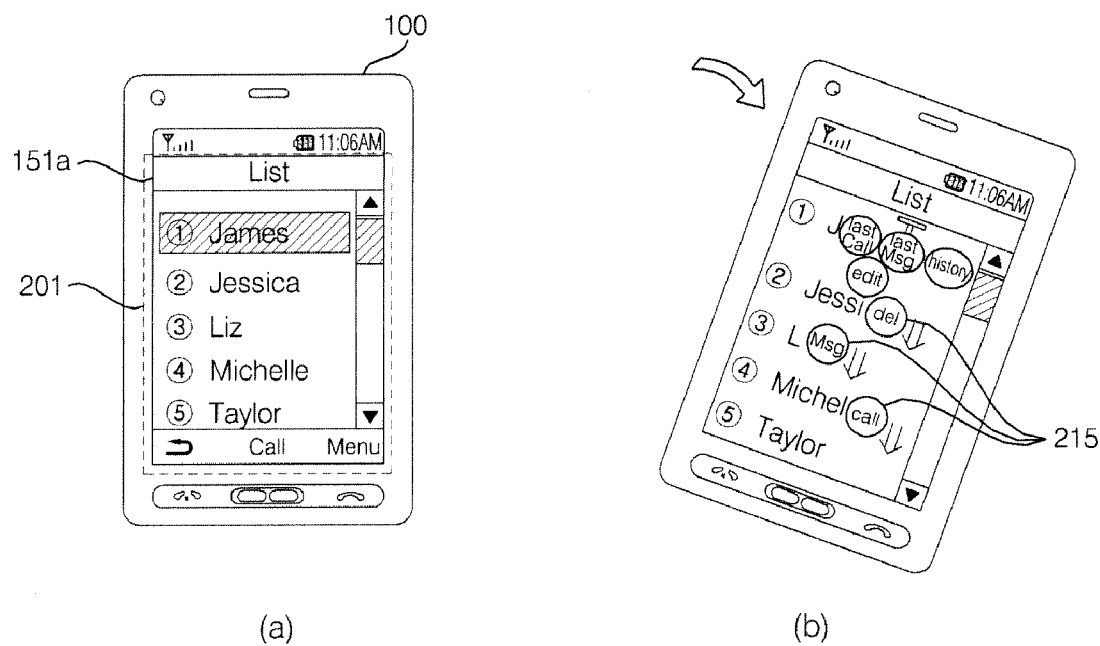
Figure 16:
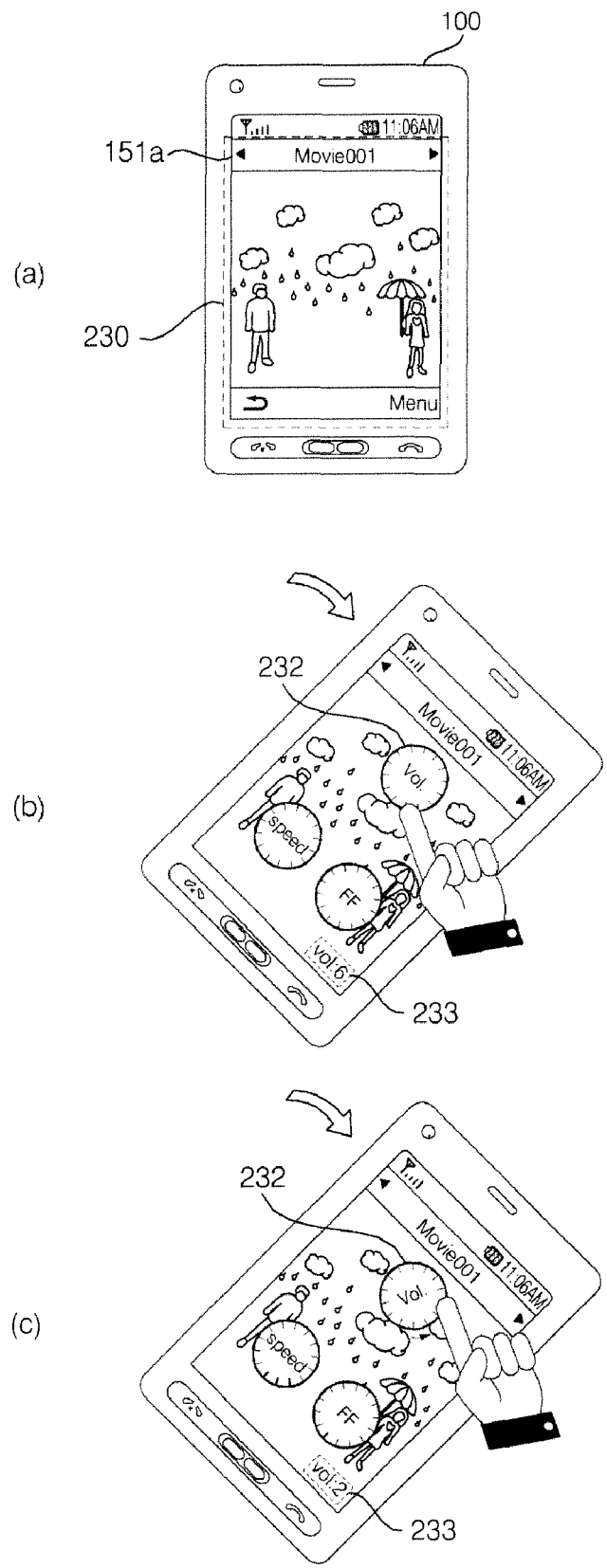

In FIG. 14(a), the phone book list 201 is displayed on the display area 151a. Upon rotation of the mobile terminal 100, the controller 180 displays application icons 215 on the display area 151a, as shown in FIG. 14(b). The application icon 215 is an animation icon, which at least one of sharpness, color, shape, display location on the display area 151a, or moving direction or speed of the display location changes over time. Hence, the display location of the application icon 215 changes over time as indicated by the arrows marked in FIG. 14(b).

The controller 180 may differentiate at least one of sharpness, color and shape of the application icon(s) which corresponds to a frequently executed application from others that are less frequently executed application icon(s). Further, the controller 180 may differentiate the display location of the application icon(s) which corresponds to a frequently executed application from others that are less frequently executed application icon(s). Hence, the user may figure out which application icon is an application icon corresponding to a frequently executed application among the displayed application icons by their appearance, such as sharpness, color, shape and the like, of the application icon(s).

In one aspect, the controller 180 may display application icon(s) including texts. The text included in the application icon(s) may describe an operation of the corresponding application. Hence, the use may figure out the application or operation to be executed that corresponds to the displayed application icon(s).

In FIGS. 15(a) through 17(b), the display area 151a is displayed on a touch screen. Referring to FIG. 15(a), the user may select an application icon 202a among the displayed application icons by touching the application icon 202a. In response to the touch input, the controller 180 highlights the selected application icon.

Referring to FIG. 15(b), the user may drag the touch selected application icon 202a to another item on the phone book list. The newly selected "Jessica" item on the phone book list includes information such as a phone number. The dragged application icon 202a corresponds to a call request application. Hence, the controller 180 executes a phone call application. Referring to FIG. 15(c), a phone call application screen is displayed on the touch screen as the phone call request application is being executed.

Referring to FIG. 16(a), the controller 180 plays "Movie 001" video file and displays the video corresponding to the "Movie 001" file on the display area 151a. When the mobile terminal 100 is rotated as shown in FIG. 16(b), the gyro-sensor 142 generates a first type signal. The controller 180 displays the volume application icon 232 upon detecting the first type signal. The user may touch the volume application icon 232 as shown in FIG. 16(b). The volume application icon 232 corresponds to an application adjusting the volume of video file being played. The controller 180 may display the volume information 233 on the lower part of the display area 151a when the touch on the volume application icon 232 is detected. The current volume level is 6 as illustrated in FIG. 16(b).

The user may toggle the volume application icon 232 in a direction indicated by the marked arrow as shown in FIG. 16(c). The controller 180 changes the volume information 233 on the display area 151a according to the toggled volume application icon 232. The new volume level is now 2 as illustrated in FIG. 16(c).

The controller 180 may detect the touch pattern of the application icon, and change the mode or setting according to the detected touch pattern. For example, the setting or mode of the content, content list or application screen may change to correspond to the detected touch pattern. Hence, when the user toggles the channel tune application icon being displayed on the touch screen after generation of the first type signal, the controller 180 may change the channel currently being displayed. Also, when the user toggles the play speed adjust application icon being displayed on the touch screen after generation of the first type signal, the controller 180 may change the speed of the file being played. While the volume setting was disclosed in FIGS. 16(a)-(c), the present invention is not limited to such embodiment exemplified in these figures.

Referring to FIG. 17(a), the displayed application icons are numbered, for example, 1-4, and a user may use the soft keys 234 corresponding to the numbered application icons 202b to execute an application. When the controller 180 detects generation of a first type signal from the gyro-sensor 142, displays the numbered application icons 202b. The controller 180 also displays the soft keys 234 corresponding to the numbered application icons 202b on the lower part of display area 151a.

The user may touch the soft keys 234 to input an application icon selection command or execution command to the mobile terminal 100 when the soft keys 234 are displayed on a touch screen. If the soft keys 234 are not displayed on a touch screen, the user may select one of the soft keys 234 by operating a navigation key equipped on the mobile phone 100. When a soft key is selected according to the input of selection command, the selected soft key is highlighted. When the mobile terminal 100 is equipped with the navigation key, the user may operate the navigation key to move the highlighted area among the soft keys 234.

Referring to FIG. 17(a), when the user touches the soft key "2" the controller 180 detects the input of execution command for the application corresponding to the numbered application icon "2." Hence, the controller 180 executes a phone call request application and FIG. 17(b) illustrates a screen displayed on the touch screen when the controller 180 executes the phone call request application.

Referring to FIGS. 18(a)-(c), an input of selection command or execution command is entered by the movement of the mobile terminal 100. A certain application icon is selected among the application icon(s) responsive to the entered selection command. A certain application menu item may also be selected among the application menu list or a certain command input key included in the command input window may be selected responsive to the entered selection command.

The execution command executes an operation corresponding to the selected application icon, application menu item or command input key. If a certain application corresponds to the selected application icon, the operation being executed would be the certain application. If a certain command input corresponds to the selected application menu item or command input key, the operation being executed would be an operation responsive to the certain command input.

As shown in FIG. 18(a), when a first type signal is generated from the gyro-sensor 142, the controller 180 displays an application icon(s) on the display area 151a and the selection application icon 202c is highlighted. When the user rotates the mobile terminal 100, as shown in FIG. 18(b), a second type signal is generated from the gyro-sensor 142 and the controller 180 highlights the next application icon 202d when the second type signal is detected. The controller 180 highlights the application icon(s) sequentially.

When the user rotates the mobile terminal 100 at a preset angle, as shown in FIG. 18(c), the gyro-sensor 142 generates a third type signal and the controller 180 executes an application corresponding to the highlighted application icon shown in FIG. 18(b) when the third type signal is generated from the gyro-sensor 142. In this embodiment, the controller 180 executes a message transmission application and displays the message transmission application screen 235 on the display area 151a.

Figure 19:
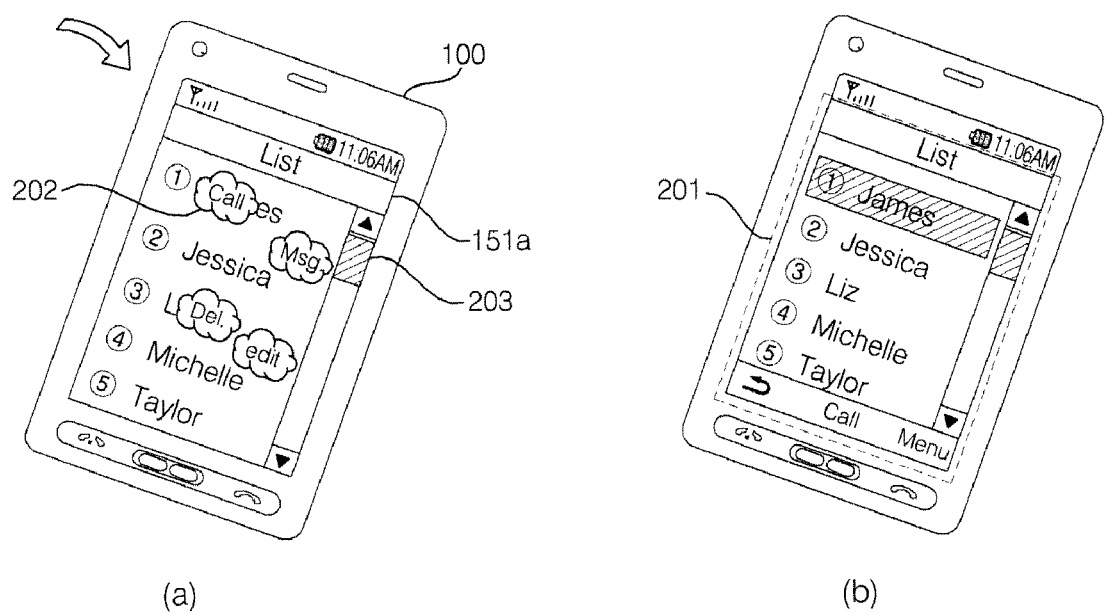

Referring to FIG. 19(a), when no selection or execution command input is detected after the display of the application icon 202, the controller 180 deletes the application icon 202. The selection or execution command input may be detected by the controller 180 when a key corresponding to the application icon, application menu item or command input key is executed. Further, the selection or execution command input may be detected when the touch screen, on which the application icon, application menu item or command input key is displayed, is touched or the second or third type signal is generated from the gyro-sensor 142. The user may change the input of selection or execution command according to the surrounding environment or as necessary.

Referring to FIG. 19(b), the controller 180 deletes the application icon 202 which was displayed after the generation of the first type signal when no selection or execution command input is detected. Hence, only the phone book list 201 is displayed on the display area 151a without any application icon.

The mobile terminal and the method of controlling the operation of the mobile terminal according to the present invention are not restricted to the embodiments set forth herein. Therefore, variations and combinations of the exemplary embodiments set forth herein may fall within the scope of the present invention.

According to an embodiment of the present invention, a mobile terminal displays an icon or command input window by which a command may be input to the mobile terminal. The display or the command input may correspond to the movement of the mobile terminal. Hence, by rotating, shaking or moving the mobile terminal according to a preset pattern, the user may execute or stop an application related to the content or the like that is being displayed on the display area.

The embodiments presented herein can be realized as codes that can be read by a processor such as a mobile station modem (MSM) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, optical data storage, and a carrier wave such as data transmission through the internet. The computer-readable recording medium can be distributed over a plurality of computer systems connected to a network such that the computer-readable code is written thereto and executed therefrom in a decentralized manner. Functional programs, code, and code segments needed for realizing the present invention can be easily construed by one of ordinary skill in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
   displaying on a display of the mobile terminal a list comprising a plurality of items;
   identifying a selected item of the plurality items of the list; detecting movement of the mobile terminal; and displaying on the display a menu comprising a plurality of items that are each associated with a function which can be performed based upon information associated with the selected item, wherein the displaying of the menu is in response to the detecting of the movement of the mobile terminal, wherein each of the plurality of items of the list relate to a contact list, and wherein the functions associated with the plurality of items of the menu are one of a calling function, a messaging function, a deleting function, or an editing function.

2. The method according to claim 1, wherein the displaying of the menu comprises:

displaying the menu as an semi-transparent overlay relative to the plurality of items of the list.

3. The method according to claim 1, wherein the displaying of the menu comprises:
displaying the menu on a portion of the display that does not overlap a portion of the display used for the displaying of the plurality of items of the list.

4. The method according to claim 1, further comprising:
modifying the displaying of the menu in a manner corresponding to a magnitude of the detected movement of the mobile terminal, the modifying comprising changing at least one of a number, type, sharpness, shape, color, display location, moving direction, or moving speed of one or more of the plurality of items of the menu.

5. The method according to claim 1, wherein the detecting movement comprises detecting a shaking of the mobile terminal, wherein a number or type of the plurality of items of the menu correspond to a number of times that the shaking occurs over a threshold time period.

6. The method according to claim 1, wherein the detecting of the movement comprises detecting rotation of the mobile terminal about a particular axis of rotation which exceeds a threshold amount of rotation, the method further comprising:
displaying the plurality of items of the menu as moving items which move in a direction which generally correspond to a direction of the rotation of the mobile terminal.

7. The method according to claim 1, wherein the detecting of the movement comprises detecting rotation of the mobile terminal about a particular axis of rotation which exceeds a threshold amount of rotation, the method further comprising:
displaying the plurality of items of the menu as moving items which move in a generally downward direction responsive to the detecting of the movement.

8. The method according to claim 1, the method further comprising:
detecting user contact with the display at a location which generally corresponds to a selected item of the plurality of items of the menu; and
executing an application that is associated with the selected item of the menu for a particular one of the plurality of items of the list responsive to user-input dragging of the selected item of the menu to an area of the display which generally corresponds to the particular one of the plurality of items of the list.

9. The method according to claim 1, wherein the detecting of the movement comprises detecting rotation of the mobile terminal about a particular axis of rotation which exceeds a threshold amount of rotation, the method further comprising:
executing an application that is associated with the selected item of the plurality of items of the list responsive to the detecting of the rotation that exceeds the threshold amount of rotation; and
displaying on the display a plurality of control items which permit control of the application, wherein each of the plurality of control items are controllable responsive to user contact with the display at an area which generally corresponds with an associated one of the plurality of control items.

10. The method according to claim 1, the method further comprising:
displaying a plurality of user-selectable control keys which individually correspond with one of the plurality of items of the menu; and
executing the function that corresponds to one of the plurality of items of the menu for the selected item responsive to user input relative to an associated one of the plurality of user-selectable control keys.

11. The method according to claim 1, wherein the detecting movement comprises:
detecting a shaking of the mobile terminal.

12. The method according to claim 1, wherein the detecting movement comprises:
detecting threshold levels of acceleration and deceleration of the mobile terminal over a defined time period.

13. The method according to claim 1, wherein the detecting movement comprises:
detecting rotation of the mobile terminal about a particular axis of rotation which exceeds a threshold amount of rotation.

14. The method according to claim 1, further comprising:
detecting further movement of the mobile terminal in a first direction; and
highlighting sequentially each item of the plurality of items of the menu responsive to each instance of the detected further movement of the mobile terminal.

15. The method according to claim 14, further comprising:
detecting movement of the mobile terminal in a second direction which substantially differs from the first direction; and
executing an application that is associated with a highlighted item of the plurality of items of the menu responsive to the detecting of the movement of the mobile terminal in the second direction.

16. A mobile terminal, comprising: a sensor configured to detect movement of the mobile terminal; a display configured to display a list comprising a plurality of items, wherein a selected item of the plurality items of the list is visually identified; and a controller configured to: cause a menu to be displayed on the display in response to the detecting of the movement of the mobile terminal, wherein the menu comprises a plurality of items that are each associated with a function which can be performed based upon information associated with the selected item, wherein each of the plurality of items of the list relate to a contact list, and wherein the functions associated with the plurality of items of the menu are one of a calling function, a messaging function, a deleting function, or an editing function.

17. The mobile terminal according to claim 16, wherein the controller is further configured to:
cause the menu to be displayed as an semi-transparent overlay relative to the plurality of items of the list.

18. The mobile terminal according to claim 16, wherein the controller is further configured to:
cause the menu to be displayed on a portion of the display that does not overlap a portion of the display used for the displaying of the plurality of items of the list.

19. The mobile terminal according to claim 16, wherein the sensor is further configured to detect a shaking of the mobile terminal, wherein a number or type of the plurality of items of the menu correspond to a number of times that the shaking occurs over a threshold time period.

20. The mobile terminal according to claim 16, wherein the sensor is further configured to detect rotation of the mobile terminal about a particular axis of rotation which exceeds a threshold amount of rotation, and the display is further configured to display the plurality of items of the menu as moving items which move in a direction which generally correspond to a direction of the rotation of the mobile terminal.

21. The mobile terminal according to claim 16, wherein the controller is further configured to:

detect user contact with the display at a location which generally corresponds to a selected item of the plurality of items of the menu; and execute an application that is associated with the selected item of the menu for a particular one of the plurality of items of the list responsive to user-input dragging of the selected item to an area of the display which generally corresponds to the particular one of the plurality of items of the list.

22. The mobile terminal according to claim 16, wherein the controller is further configured to:

display a plurality of user-selectable control keys which individually correspond with one of the plurality of items of the menu; and execute the function that corresponds to one of the plurality of items of the menu for the selected item responsive to user input relative to an associated one of the plurality of user-selectable control keys.

23. The mobile terminal according to claim 16, wherein the detecting movement comprises detecting a shaking of the mobile terminal.

24. The mobile terminal according to claim 16, wherein the detecting movement comprises detecting threshold levels of acceleration and deceleration of the mobile terminal over a defined time period.

25. A method of controlling a mobile terminal, the method comprising:

displaying on a touchscreen display of the mobile terminal a list comprising a plurality of items;

highlighting a selected item of the plurality items of the list;

detecting movement of the mobile terminal;

displaying on the display a menu comprising a plurality of items that are each associated with a function which can be performed based upon information associated with the selected item, wherein the displaying of the menu is in response to the detecting of the movement of the mobile terminal, wherein each of the plurality of items of the list relate to a contact list, and wherein the functions associated with the plurality of items of the menu are one of a calling function, a messaging function, a deleting function, or an editing function;

detecting user contact with the display at a location which generally corresponds to a selected item of the plurality of items of the menu; and executing an application that is associated with the selected item for a particular one of the plurality of items of the list responsive to user-input dragging of the selected item to an area of the display which generally corresponds to the particular one of the plurality of items of the list.

\* \* \* \* \*